United States Patent
Chang

(10) Patent No.: US 6,456,975 B1
(45) Date of Patent: Sep. 24, 2002

(54) AUTOMATED CENTRALIZED UPDATING OF SPEECH RECOGNITION SYSTEMS

(75) Inventor: Eric I-Chao Chang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/482,738

(22) Filed: Jan. 13, 2000

(51) Int. Cl.7 .................................................. G10L 15/00
(52) U.S. Cl. .................................... 704/270.1; 704/244
(58) Field of Search ................................. 704/270, 275, 704/243–245, 231, 251, 255–257, 270.1

(56) References Cited

U.S. PATENT DOCUMENTS

| | | | | | |
|---|---|---|---|---|---|
| 5,452,340 A | * | 9/1995 | Engelbeck et al. | ............ | 379/67 |
| 5,677,991 A | * | 10/1997 | Hsu et al. | .................... | 704/255 |
| 5,719,921 A | * | 2/1998 | Vysotsky et al. | ........... | 704/275 |
| 5,748,841 A | * | 5/1998 | Morin et al. | ................. | 704/257 |
| 5,797,116 A | * | 8/1998 | Yamada et al. | ............. | 704/244 |
| 5,809,494 A | | 9/1998 | Nguyen | | |
| 6,173,259 B1 | * | 1/2001 | Biji et al. | .................... | 704/235 |

OTHER PUBLICATIONS

Press Release, "Speechworks International announces development of telephone–based speech recognition easier than ever," Dec. 15, 1998, available on web site www.speechworks.com.

Press Release, "Speechworks introduces Speechworks 4.0 featuring the industry's first advanced tuning tools for speech recognition interfaces, " Sep. 23, 1988, available on web site www.speechworks.com.

Press Release, "digiTrade selects Speechworks' speech recognition to deploy service bureau for financial firms", May 18, 1998, available on web site www.speechworks.com.

Press Release, "Speechworks International and Artisoft team up to simplify the creation of speech–activated computer telephony applications," Dec. 16, 1998, available on web site www.speechworks.com.

\* cited by examiner

*Primary Examiner*—David D. Knepper
(74) *Attorney, Agent, or Firm*—Joseph R. Kelly; Westman, Champlin & Kelly, P.A.

(57) ABSTRACT

In one embodiment, a speech recognition program at a client receives data that is unrecognized, such as an unrecognized word, an unrecognized pronunciation of a known word, an unrecognized dialect of a known, and/or a substantially new word frequency usage. The client transmits the data to a provider, which processes the data into known data, and transmits the known data back to a number of clients, including the client that initially sent the unrecognized data. In one embodiment, the unrecognized data is sent from the client to the provider via a third party, to anonymize the data.

26 Claims, 3 Drawing Sheets

AUTOMATED CENTRALIZED UPDATING OF SPEECH RECOGNITION SYSTEMS

FIELD OF THE INVENTION

This invention relates generally to speech recognition systems, and more particularly to automated centralized updating of such systems.

BACKGROUND OF THE INVENTION

Speech recognition has become an increasingly popular application for computers and computerized devices. It affords users an alternative manner by which to accomplish input, in lieu of or in addition to standard manners of input such as keyboard entry, and pointing device input. Thus, users who cannot type, or prefer not to type, are still able to interact with their computers. Speech recognition can be used for sending commands to the computer, such as pointer movement and pointer clicking, as well as for applications such as text dictation into a word processing program, etc.

A common problem with speech recognition is known as the out-of-vocabulary (OOV) problem. If a word is not in the lexicon, or dictionary, of the speech recognition system that a user is using, the system is unable to recognize the word correctly when spoken by the user. The OOV problem can occur both when the user uses words that are very uncommon and therefore not in the dictionary, or when the user uses words that have been newly introduced into common usage. As an example of the former, a zoologist may use technical words that are uncommon to the population as a whole, and therefore not found in the dictionary. As an example of the latter, a speech recognition system developed prior to the widespread acceptance of the Internet may not have the word "Internet" in its vocabulary.

For this and other reasons, there is a need for the present invention.

SUMMARY OF THE INVENTION

The invention relates to automated centralized updating of speech recognition systems. In one embodiment, a speech recognition program at a client, such as a computer or a computerized device like a personal-digital-assistant (PDA) device or a wireless phone, receives data that is unrecognized. The data can in varying embodiments represent one or more of an unrecognized word, an unrecognized pronunciation of a known word, an unrecognized dialect of a known word, and a substantially new word frequency usage. The client transmits the data to a provider. The provider processes the data into known data, and transmits the known data back to a number of clients, possibly including the client that initially sent the unrecognized data. For privacy and/or other concerns, the unrecognized data may be sent from the client to the provider via a trusted third party, to anonymize the data.

Embodiments of the invention provide for advantages not found within the prior art. Rather than have users individually endure training of their speech recognition systems with new words, dialects, word frequency usages, etc., embodiments of the invention leverage the users' collective encountering of new words, dialects, word frequency usages, etc. For example, if the word "Internet" is not known to the speech recognition program of a number of users, generally the first user encountering this word will cause his or her speech recognition program to send the unrecognized data representing the word to the provider. The provider can then process the unrecognized data into known data representing the word, and have the known data transmitted back to all users, eliminating the need for every user to individually train his or her speech recognition program with the new word. Thus, the vocabularies of the speech recognition programs of users collectively grow as any user encounters new words. Furthermore, words, dialects, etc., that are particular to a specific group or region of people, such as a group of zoologists, or the region of people living in Mississippi, etc., can be collected and transmitted only among that specific group or region of people.

It is noted that the invention can be implemented in different manners as to clients and servers. For example, in some embodiments, the speech recognition program and the vocabulary therefor is maintained at the client level, such that the server only exists to render improvements to the vocabulary for transmission back to the clients, which then incorporate the improvements back into their speech recognition program vocabularies. This is most apt for applications where users have one primary client on which they use speech recognition, such as a desktop computer. While the invention described in the detailed description is largely specific to this embodiment, the invention itself is not so limited, however.

For example, in other embodiments, the speech recognition program runs on clients, but the vocabulary is stored and maintained at the server level. The clients therefore still perform the speech recognition process, but this process utilizes data from the vocabulary as stored on the server, such that the clients access the server as necessary. This is most apt for applications where users have many clients on which they use speech recognition, where all the clients have sufficient processing power to perform speech recognition.

In still other embodiments, the speech recognition program runs at the server level, and the vocabulary is stored and maintained at the server level. Thus, the clients act solely to detect speech, and pass the speech on as detected to the server, which itself conducts the speech recognition, and passes back any recognized speech back to the clients. This is most apt for applications where the clients do not have sufficient processing power to perform speech recognition, such as wireless phones, and some personal digital assistant (PDA's). These embodiments are example embodiments of the invention, furthermore—the invention itself is not limited to splitting the speech recognition and vocabulary improvement process among the clients and the server in any of these recited manners.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
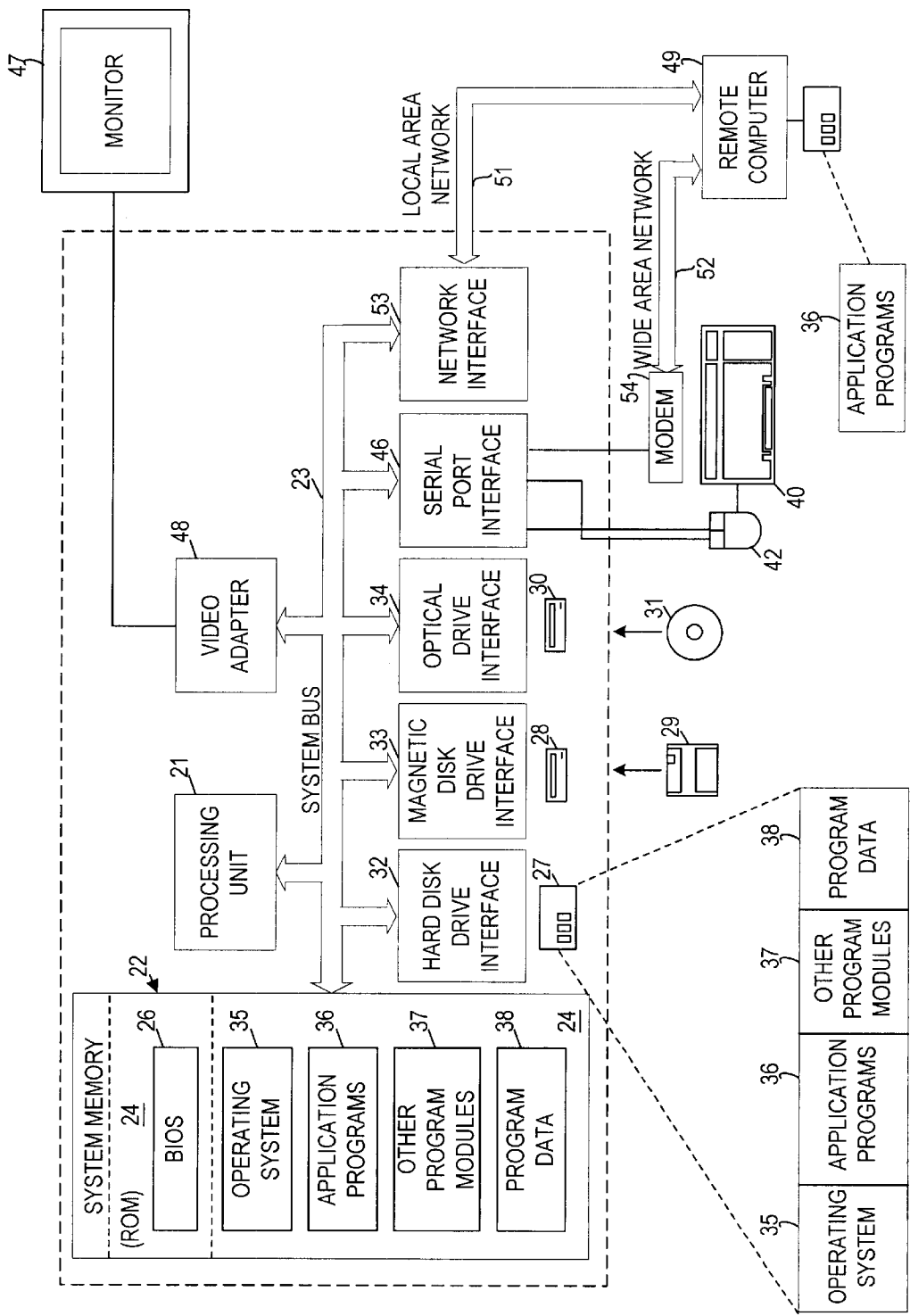
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Methods

In this section of the detailed description, methods according to varying embodiments of the invention are presented. In some embodiments, the methods are computer-implemented. The computer-implemented methods can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer.

Figure 2:
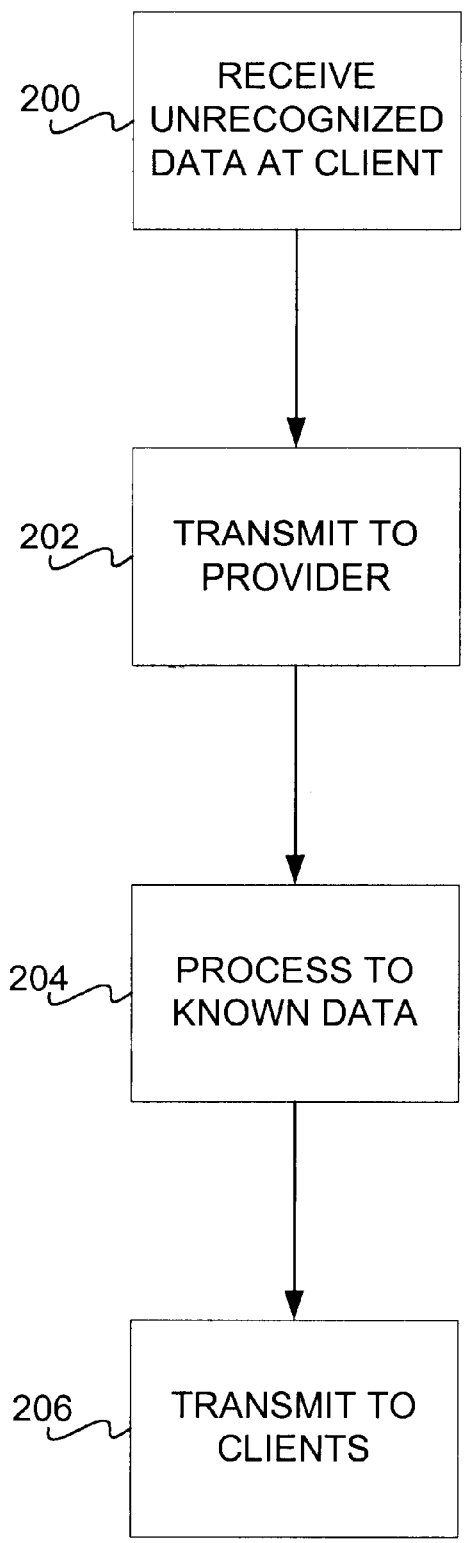
FIG. 2 is a flowchart of a method according to an embodiment of the invention; and, FIG. 3 is a diagram of a system according to an embodiment of the invention.

Referring to FIG. 2, a flowchart of a method according to an embodiment is shown. In 200, unrecognized data is received by a speech recognition program at a client. The client can be a computer, or a computerized device, such as a wireless phone, a personal-digital-assistant (PDA) device, etc.; the invention is not so limited. The unrecognized data relates to speech spoken by a user of the client that the program does not understand. For example, the unrecognized data can represent one or more of: (1) an unrecognized word, such as a new word not already in the vocabulary of the program, or a specialized word that has rare usage in the general population that is not in the vocabulary; (2) an unrecognized pronunciation of a known word, such as the alternative pronunciation of the word "harass" as "HAR-ass," as opposed to the more common pronunciation "ha-RASS," where the capitalized syllable indicates the emphasized or stressed syllable; (3) an recognized dialect of a known word, such as a Southern, Northeastern, or foreign accent not understood by the program; and, (4) a substantially new word frequency usage, such as the phrase "Dow Jones Industrial Average" where the word "Jones" is likely to occur immediately after the word "Dow," and the words "Industrial Average" are likely to occur immediately after the words "Dow Jones"; etc. The invention is not limited to any of these particular unrecognized data, nor to any of the recited examples of these unrecognized data.

The data can be recognized as unknown by the program in either an explicit or an implicit manner. In an explicit manner, the user corrects the program's guess as to what the word is explicitly, and/or, the program explicitly indicates to the user that it does not recognize the word spoken. An example of the former is the speech recognition program guessing the word "Internet" as two words, "Inter" and "Net," with the user explicitly correcting the program, or the program indicating to the user that it did not understand what the user said. An example of the latter is the user commanding the speech recognition program "Give me directions to Harvard" in a Northeastern accent in which "Harvard" is pronounced "Hah-vahd," the program responding in a synthesized voice (for example), "You want to go Havad," the user then stating, "No, to Harvard," attempting to pronounce the "r's" in the word "Harvard," and finally the program responding "Here are the directions to Harvard that you requested." Here, the program implicitly recognizes an unknown dialect and/or pronunciation of the word "Harvard," since it did not understand what the user initially said, forcing a dialog with the user to understand the word that he or she meant. Thus, explicit correction is when the user specifically corrects a word, while implicit correction is when the user repeats a previously spoken command.

The unrecognized data is transmitted to a provider in 202. The data that is transmitted may be a speech waveform that is the digital representation of what the user spoke but which was unrecognized by the program at the client in 200, in one embodiment. The data can be data that is unrecognized by one or more of an acoustic model, a language model, a lexicon (i.e., a vocabulary or a dictionary), etc., of the speech recognition program at the client. In one embodiment, the data is transmitted to the provider over a network such as the Internet. In one particular embodiment, the unrecognized data is transmitted from the client and received by the provider by way of a third party. The third party can anonymize the data received from the client before sending it on to the provider, such that the identity of the user is unknown to the provider, for privacy concerns of the user. The third party in this instance is desirably a party trusted by the user. Generally, the transmission to the third party of the unrecognized data, and the retransmission of the unrecognized data to the provider by the third party, is conducted in an automated manner.

In 204, the provider processes the unrecognized data to known data, for re-inclusion into and updating of the vocabulary of the speech recognition programs of various clients. In one embodiment, this can involve in an automated manner processing the data so that it can be integrated into the vocabulary. In another embodiment, this can involve an analyst or other person examining the data to determine if it should be processed and included into the vocabulary, and, if so, processing the data. In still another embodiment, a combination of automated and manual approaches can be used, such that most words are automatically processed for vocabulary integration, while other words are manually processed. The invention is not so limited.

Finally, in 206, the known data is transmitted to a number of clients, such as the client who originally transmitted the data in 202. When the known data is transmitted to a given client, it can then be automatically integrated into the vocabulary of the speech recognition program (also referred to as the lexicon of the program, or the dictionary of the program), in an automated manner by the program itself, and optionally in one embodiment with prior user approval. The transmission in one embodiment is accomplished over a network such as the Internet. Ultimately, this process allows for all users to benefit from new words, pronunciations, etc., encountered by any of the users, growing collectively the vocabularies of the speech recognition programs of the users' clients.

In one embodiment, each client is associated with one or more different linguistic groups, such that the client only receives new known data from the provider when such data corresponds to one of its linguistic groups. For example, a zoologist located in Boston may have three groups associated with his or her client: a general new words group, a Northeastern dialect or accent group, and a zoology group. New words that have been entered into the general population as a whole, such as the word Internet, may be sent to the zoologist as a result of his or her membership in the general new words group. Pronunciations of words in a Northeastern dialect or accent, such as may typically be spoken by Bostonians, may be sent to the zoologist as a result of his or her membership in the Northeastern dialect or accent group. Finally, new words particular to zoology may be sent to the zoologist as a result of his or her membership in the zoology group. Allowing for different linguistic groups ensures that, for example, a Californian does not receive new data corresponding to pronunciations of words in a Northeastern dialect or accent, and that, for example, a patent attorney does not receive new data corresponding to words particular to zoology that are most apt only to be used by zoologists.

It is also noted that embodiments of the invention can be applied to a variety of computers and computerized devices, as the clients as have been described herein. A description of a computer has been provided in the previous section of the detailed description. Types of computers include laptop computers, desktop computers, and handheld computers, also known as personal digital assistants (PDA's). Wireless phones, electronic book devices and other computerized devices are amenable to the invention. Still other computers and computerized devices in addition to those referred to herein are also amenable to embodiments of the invention.

Embodiments of the invention can be alternatively desktop-centric or server-centric. In the former, improvements in the vocabulary of a speech recognition program for a given user are maintained at the client of the user. Where the user has a slow connection to the network over which he or she communicates with the central provider, and/or has only a primary or single device on which he or she uses speech recognition, the desktop-centric approach is desirable. However, the user may have a number of devices on which he or she uses speech recognition, such as a laptop computer, a handheld computer, a desktop computer, and a wireless phone. To ensure that the user has the same vocabulary for each of these devices, a server-centric approach may instead be more appropriate. In a server-centric approach, the vocabulary is maintained at a server for the user, such that use of any device by the user causes the speech recognition program of the device to communicate with the server. This approach is more usable when the network connection between the device and the server is relatively fast. In such an approach, the client to which the provider transmitted the data in 206 in fact encompasses an intermediary server that maintains the vocabulary for the user. Thus, the term client as used herein is inclusive of such a server in this context.

Furthermore, in other embodiments of the invention, the speech recognition program itself is run on a server, such that the client itself only detects speech, and passes the speech as detected onto the server, where the server engages in the process of recognition. This embodiment is also a server-centric approach. In this embodiment, in addition to the vocabulary being maintained at the server for the user, the speech recognition process itself is conducted at the server. Thus, the client in this embodiment serves as a "dumb" client, in that its only function in the speech recognition process is to detect speech and pass that speech onto the server, which actually performs the recognition thereof.

Systems

Figure 3:
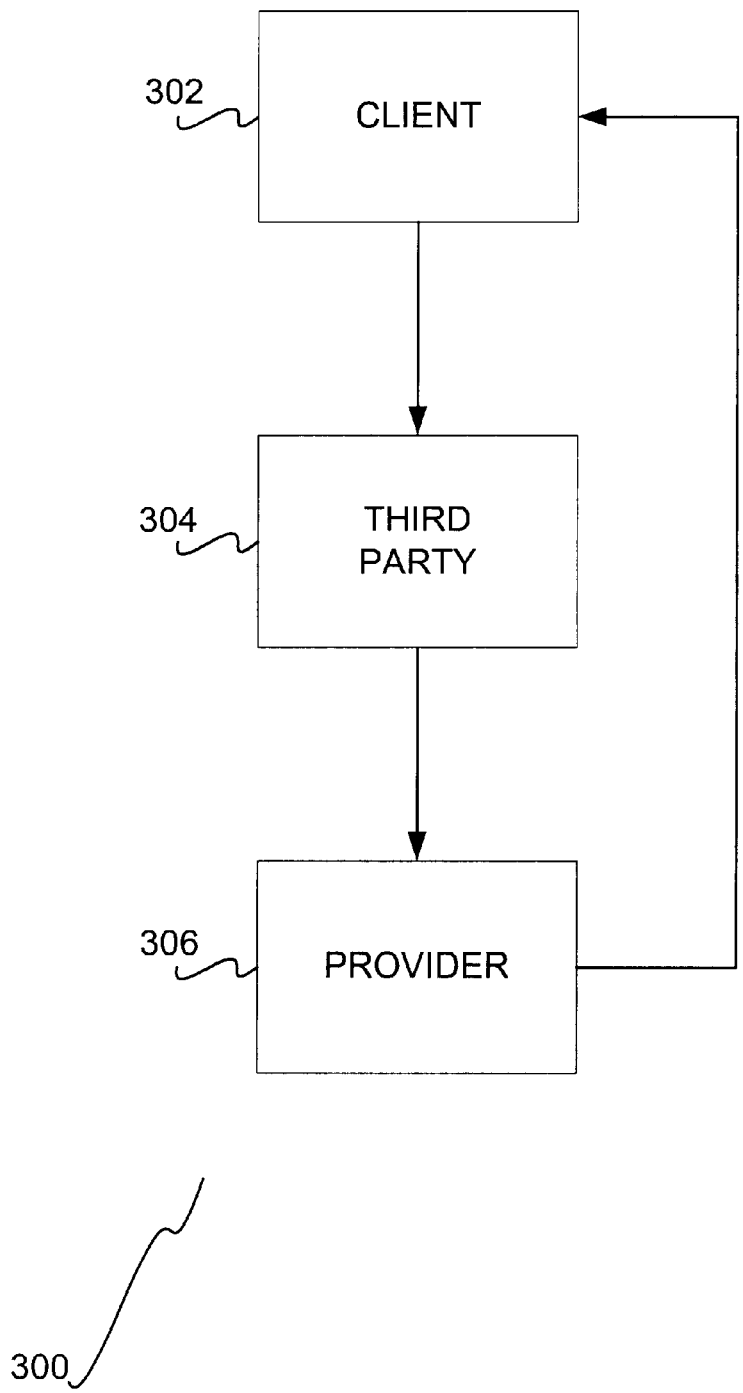

In this section of the detailed description, systems according to varying embodiments of the invention described. Referring to FIG. 3, a diagram of a system according to a specific embodiment is shown. The system 300 includes a client 302, a provider 306, and an optional third party 304. The client 302 is capable of having a speech program running thereon designed to receive unrecognized data. In one embodiment, the client 302 has a microphone capable of detecting sound data, and a computer program designed to: receive unrecognized sound data from the microphone; transmit the unrecognized sound data to the provider 306, optionally by way of the third party 304; and, receive known data from the provider as previously processed thereby from the unrecognized sound data, for integration into a model or vocabulary of the speech recognition program of the client 302. In one embodiment, the program acts as a means for so performing this functionality.

As has been described in the previous section of the detailed description, the user may be grouped with other users in one or more linguistic classes. Furthermore, the unrecognized data may represent in one embodiment one or more of: an unrecognized pronunciation of a known word; an unrecognized word; an unrecognized dialect of a known word; and, a substantially new word frequency usage. The data that is transmitted to the provider 306, optionally via the third party 304, can in one embodiment include a speech waveform. The invention is not so limited, however. The client 302 can be a computer, a computerized device, an intermediary server, etc., as has been described in the previous section of the detailed description.

The provider 306 is thus designed to process the unrecognized data as received from the client 302, into known data, and to transmit the known data to a number of clients, such as the client 302. The provider 306 can be a server in one embodiment, that is communicatively coupled with the client 302, with other clients, and with the provider 306, over a network, such as the Internet. The provider 306 can also be a computer as has been described in a previous section of the detailed description, although the invention is not so limited.

The third party 304, when it is optionally present (viz., its presence is not required in the system 300 of FIG. 3) is designed to at least receive the unrecognized data from the client 302, and to transmit the unrecognized data to the provider 306 such that the identity of the client 302 remains unknown to the provider 306. This is to assuage privacy concerns of the user of the client 302. The third party 304 is thus run by a party trusted by the client 302. As used herein, the third party 304 can in one embodiment typically be a server, also communicatively coupled with the client 302, with other clients, and with the provider 306, over a network, such as the Internet. The third party 304 can thus be a computer as has been described in a previous section of the detailed description, although the invention is not so limited. In one embodiment, it is the third party 304 that is responsible for grouping the client 302 with other clients in the same linguistic class or classes, such that the third party 304 is designed for this purpose as well.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

I claim:

1. A computer-implemented method comprising:
   receiving unrecognized data by a speech recognition program at a particular client;
   transmitting the unrecognized data from the particular client to a provider;
   processing the unrecognized data at the provider into a known data; and
   transmitting the known data to at least one client other than the particular client.

2. The method of claim 1, wherein transmitting the unrecognized data from the particular client to a provider comprises transmitting the unrecognized data from the particular client to the provider by way of a third party to at least anonymize the unrecognized data.

3. The method of claim 1, wherein transmitting the unrecognized data from the particular client to a provider comprises transmitting the unrecognized data from the particular client to the provider by way of a third party to at least group the particular client with other clients within a predetermined linguistic class.

4. The method of claim 1, wherein receiving unrecognized data comprises receiving unrecognized data comprising at least one of: data representing an unrecognized word; data representing an unrecognized pronunciation of a known word; data representing an unrecognized dialect of a known word; and, data representing a substantially new word frequency usage.

5. The method of claim 1, wherein receiving unrecognized data comprises receiving a speech waveform.

6. The method of claim 1, wherein receiving unrecognized data comprises receiving the unrecognized data in an implicit manner.

7. The method of claim 1, wherein receiving unrecognized data comprises receiving the unrecognized data in an explicit manner.

8. A computer-implemented method comprising:
   receiving unrecognized data by a speech recognition program at a particular client;
   transmitting the unrecognized data from the particular client to a third party to group the particular client with other clients within a predetermined linguistic class;
   transmitting the unrecognized data from the third party to a provider;
   processing the unrecognized data at the provider into known data; and,
   transmitting the known data to at least one client including the particular client.

9. The method of claim 8, wherein receiving unrecognized data comprises receiving unrecognized data comprising at least one of: data representing an unrecognized word; data representing an unrecognized pronunciation of a known word; data representing an unrecognized dialect of a known word; and, data representing a substantially new word frequency usage.

10. The method of claim 8, wherein receiving unrecognized data comprises receiving a speech waveform.

11. The method of claim 8, wherein receiving unrecognized data comprises receiving the unrecognized data in one of an explicit manner and an implicit manner.

12. A machine-readable medium having instructions stored thereon for execution by a processor of a speech recognition provider to perform a method comprising:
   receiving unrecognized data generated by a speech recognition program of a particular client, and initially sent by the particular client;
   processing the unrecognized data into known data, wherein the known data is associated with one or more linguistic groups; and,
   transmitting the known data to a plurality of clients associated with said one or more different linguistic groups.

13. The medium of claim 12, wherein receiving unrecognized data comprises receiving the unrecognized data directly from the particular client.

14. The medium of claim 12, wherein receiving unrecognized data comprises receiving the unrecognized data from a third party to which the particular client directly sent the unrecognized data, such that an identity of the particular client remains unknown to the speech recognition provider.

15. The medium of claim 12, wherein receiving unrecognized data comprises receiving unrecognized data comprising at least one of: data representing an unrecognized word; data representing an unrecognized pronunciation of a known word; data representing an unrecognized dialect of a known word; and, data representing a substantially new word frequency usage.

16. The medium of claim 12, wherein receiving unrecognized data comprises receiving a speech waveform.

17. A computerized system comprising:
   a particular client capable of having a speech recognition program running thereon designed to receive recognized data and unrecognized data; and,
   a provider designed to process the unrecognized data into known data and to transmit the known data to at least one client including the particular client, the particular client being further designed to transmit unrecognized data to the provider such that unrecognized data received by the provider is substantially independent of recognized data.

18. The system of claim 17, further comprising a third party designed at least to receive the unrecognized data from the particular client and to transmit the unrecognized data to the provider so that the particular client remains unknown to the provider.

19. The system of claim 18, wherein the third party is further designed to group the particular client with other clients within a predetermined linguistic class.

20. The system of claim 17, wherein the unrecognized data comprising at least one of: data representing an unrecognized word; data representing an unrecognized pronunciation of a known word; data representing an unrecognized dialect of a known word; and, data representing a substantially new word frequency usage.

21. The system of claim 17, wherein the unrecognized data comprises a speech waveform.

22. A client computer system configured to perform speech recognition, comprising:
   a microphone capable of detecting sound data;
   means for
      receiving unrecognized sound data from the microphone;
      transmitting the unrecognized sound data to a provider; and,
      receiving known data from the provider previously processed by the provider from unrecognized sound data.

23. The client computer system of claim 22, wherein the means is to transmit the unrecognized sound data to the provider by way of a third party to at least anonymize the unrecognized sound data.

24. The client computer system of claim 22, wherein the means is to transmit the unrecognized sound data to the provider by way of a third party to at least group the client computer system with other client computer systems within a predetermined linguistic class.

25. The client computer system of claim 22, wherein the unrecognized sound data comprises at least one of: data representing an unrecognized word; data representing an unrecognized pronunciation of a known word; data representing an unrecognized dialect of a known word; and, data representing a substantially new word frequency usage.

26. The client computer system of claim 22, wherein the unrecognized sound data comprises a speech waveform.

* * * * *